April 22, 1947.  W. H. SILVER  2,419,467

CLUTCH MECHANISM

Filed Oct. 26, 1942  3 Sheets-Sheet 1

INVENTOR
Walter H. Silver

BY
ATTORNEYS

April 22, 1947.  W. H. SILVER  2,419,467
CLUTCH MECHANISM
Filed Oct. 26, 1942  3 Sheets-Sheet 2

INVENTOR
Walter H. Silver
BY
ATTORNEYS

April 22, 1947.    W. H. SILVER    2,419,467
CLUTCH MECHANISM
Filed Oct. 26, 1942    3 Sheets-Sheet 3
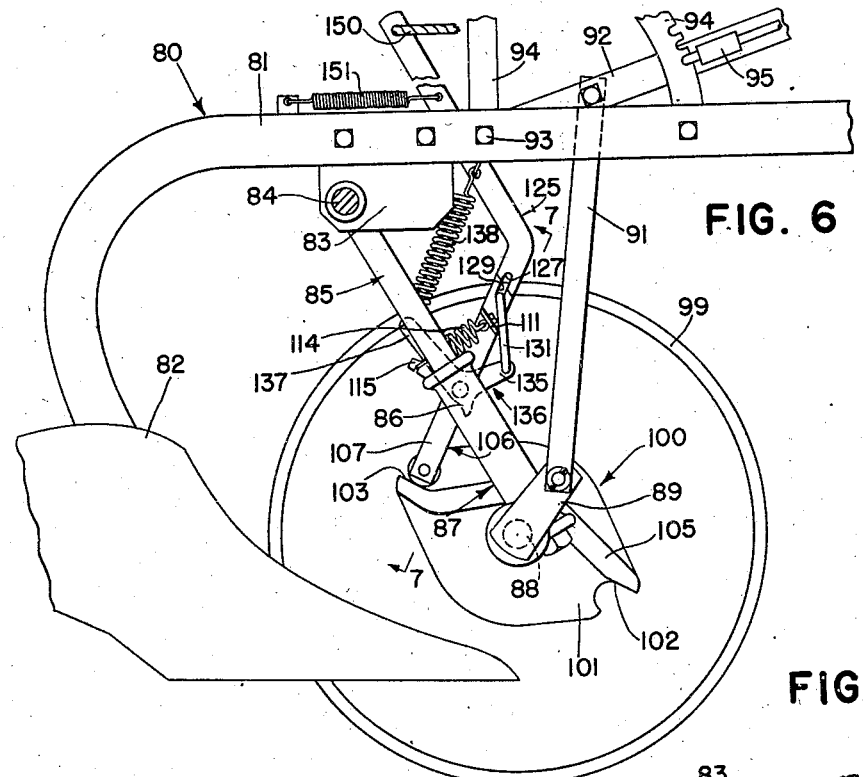
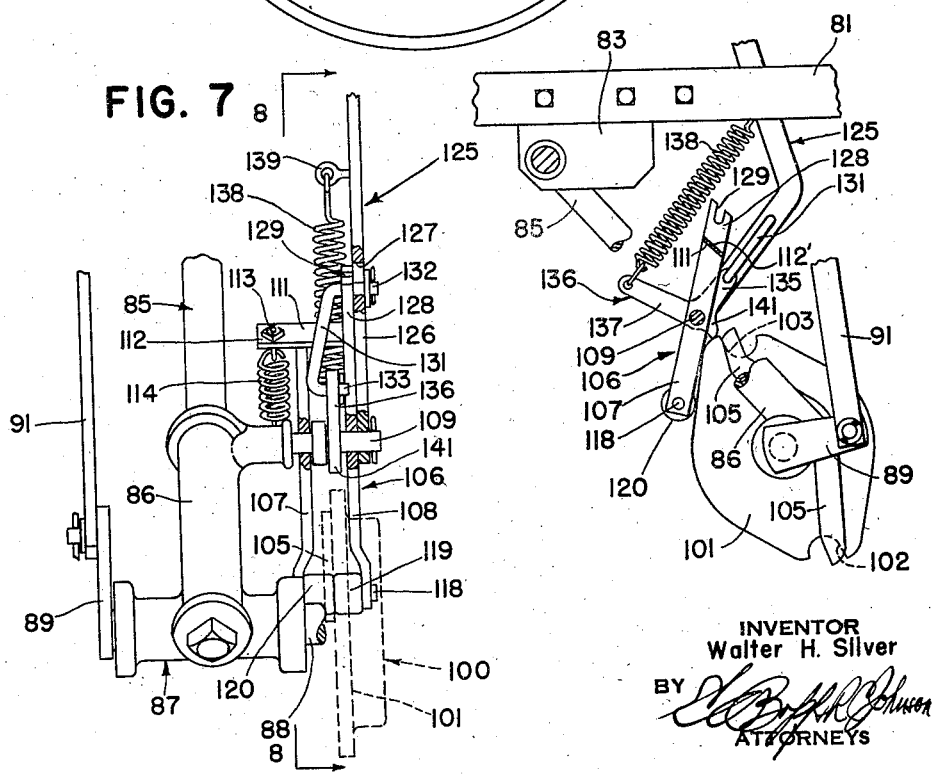
INVENTOR
Walter H. Silver
BY
ATTORNEYS Patented Apr. 22, 1947

2,419,467

UNITED STATES PATENT OFFICE 2,419,467

CLUTCH MECHANISM

Walter H. Silver, Moline, Ill., assignor to Deere & Company, Moline, Ill., a corporation of Illinois Application October 26, 1942, Serial No. 463,441

13 Claims. (Cl. 97—73)

1

The present invention relates generally to self-interrupting clutch mechanisms for agricultural implements and the like and is particularly concerned with clutches of the half-revolution type arranged to raise and lower the tools or other parts of an agricultural implement. Generally speaking, prior lifting clutches of agricultural implements and the like have included a hand lever or other manually operated part which when moved into one position caused the clutch to connect, thereby raising or lowering the tool or tools or other implement part. Under some conditions, however, if the operator did not release the manually operated member quickly enough, the half-revolution clutch mechanism might remain engaged so that it would not stop at the end of the first cycle but would go into and complete the second cycle before the operator could release the manual control.

The object and general nature of the present invention is the provision of self-interrupting clutch mechanism for agricultural implements and the like in which the control is arranged so that the connections between the manual control member and the clutch mechanism are automatically disconnected by the movement of the driven member of the clutch into or through a given position, whereby the actuation of the clutch mechanism is automatically terminated at the end of the first cycle, as is desired, irrespective of whether or not the operator releases the manual member at the proper instant.

One feature of my invention is the provision of a two-part clutch controlling member, in which the parts are connected by a latch that is released when the driven part of the clutch moves a predetermined amount, whereby the position of one part is then independent of the position of the other part.

More specifically, it is a feature of this invention to provide a clutch control in which a manually operated member is connected through toggle links with the clutch controlling latch dog, the toggle links being constructed and arranged so that the toggle is broken or disabled by the movement of the driven member of the clutch, thereby permitting the latch dog to return to its normal clutch disconnecting position, even though the operator may still hold the manually operated member in its clutch connecting position. Thus, it is impossible for the mechanism to move through more than one cycle at any one time.

These and other objects and advantages of the present invention will be apparent to those skilled in the art after a consideration of the following detailed description, taken in conjunction with the accompanying drawings.

In the drawings:

Figure 6 is a side view of a modified form of the present invention, particularly adapted for towed plows and like implements;

Figure 7 is an enlarged fragmentary sectional view taken generally along the line 7—7 of Figure 6; and Figure 8 is a view, similar to Figure 6, taken generally along the line 8—8 of Figure 7.

Figure 1:
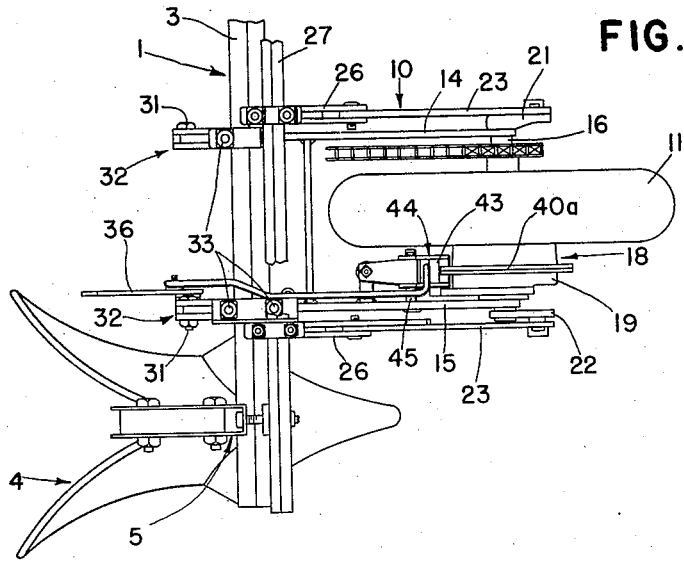
Figure 1 is a plan view of a portion of an agricultural implement in which the principles of the present invention have been incorporated.
Figure 2:
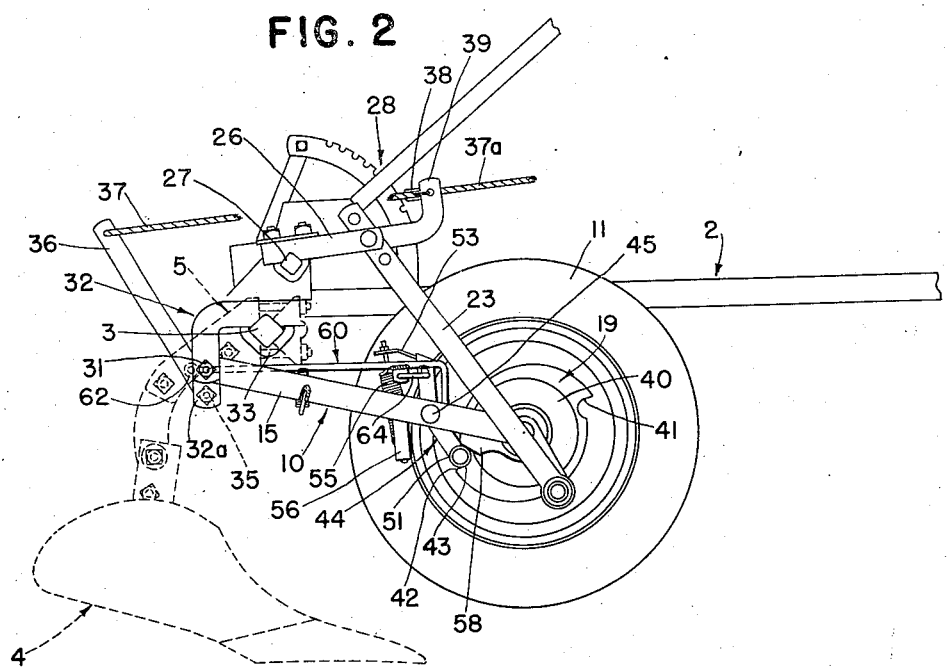
Figure 2 is a side view of the structure shown in Figure 1.

Referring now to the drawings, more particularly Figures 1 and 2, the agricultural implement, shown fragmentarily in Figures 1 and 2, that has been chosen to illustrate the principles of the present invention, is a tractor drawn tool bar cultivator like that shown in my U. S. Patent No. 2,385,950, issued October 2, 1945, to which reference may be made if necessary. Briefly, the implement, which is indicated in its entirety by the reference numeral 1, includes a generally forwardly extending hitch frame 2, the rear portion of which is formed by a transversely disposed tool bar 3 upon which tools such as one or more lister bottoms 4 are adapted to be secured, as by clamping means 5. As best shown in said prior patent, the implement frame 2 is relatively wide so as to accommodate a considerable number of tools and is provided with a pair of power actuated lifting means, each including a crank axle 10 and a ground wheel 11. Preferably, the crank axle or swinging member 10 includes a pair of bars 14 and 15 which at their forward or lower ends carry an axle 16 upon which the ground wheel 11 is journaled for rotation. Associated with the ground wheel 11 is a power lift clutch 18 of the self-interrupting or half-revolution type, which incorporates a driving member (not shown) secured to or driven by the wheel 11 and a driven member 19 of which the axle 16 is a part. A pair of cranks 21 and 22 are connected to the axle 16 and act through upwardly extending links 23 (Figure 2) to raise the frame 2, the upper ends of the links being connected by arms 26 to a lifting rockshaft 27 which is normally held in adjusted position by a lever and detent mechanism 28. The rear ends of the bars 14 and 15 making up the crank axle 10 are pivoted, as at 31 (Figure 2), to a pair of brackets 32 (Figure 1) secured by U-bolts 33 to the tool bar 3. The brackets 32 preferably comprise generally U-shaped strap members, and the laterally outer brackets 32 includes one section 32a that extends downwardly beyond the other section and is apertured to receive a pivot bolt 35 on which an actuating lever 36 is mounted. The rear end of a cable 37 is fixed to the upper end of the actuating lever 36 and extends forwardly and is trained through a pulley 38 carried on a bracket 39 forming a part of the laterally outer arm 26, and the cable 37 is extended forwardly, as at 37a, to the operator's station on the tractor.

Figure 5:
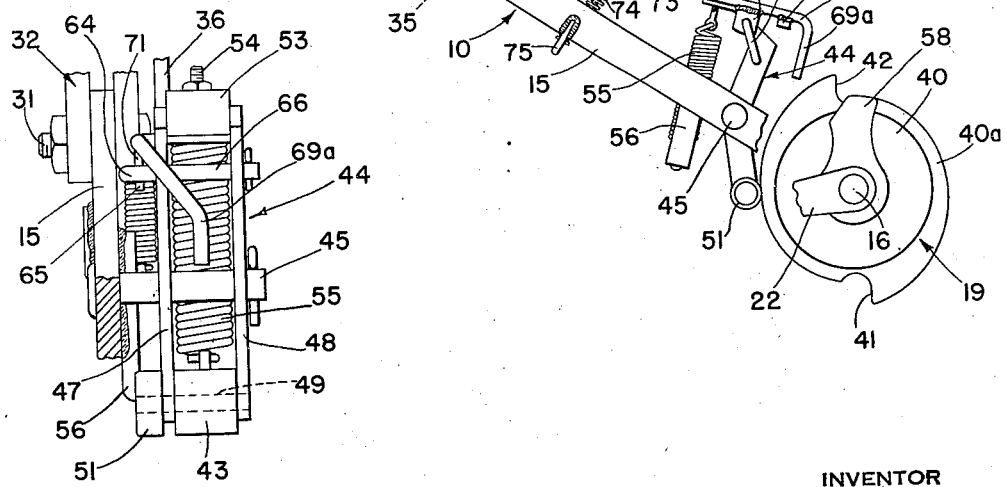
Figure 5 is a view taken generally along the line 5—5 of Figure 3.

The self-interrupting clutch 18 is constructed substantially like the clutch disclosed and claimed in my U. S. Patent No. 2,346,514, issued April 11, 1944, to which reference may be made if necessary. Briefly, the clutch includes an inner clutch dog (not shown) which is controlled by the movement of the clutch casing, indicated by the reference numeral 40 in Figure 2, relative to the driving parts of the clutch, and the casing is provided with a pair of generally oppositely arranged notches 41 and 42, in either of which the roller 43 on a pivoted latch dog 44 is adapted to engage. The latch dog 44 is mounted for pivotal movement on a stud 45 that is fixed to the outer crank axle bar 15 (Figure 1). The latch dog 44 is best shown in Figure 5, from which it will be seen that the latch dog 44 includes a pair of strap members 47 and 48, both mounted on the stud 45 and carrying a pin upon which the roller 43 is mounted, together with a casing-engaging auxiliary roller 51 also mounted on said pin. An arm 53 is fixed, as by welding or the like, to the upper ends of the latch dog straps 47, 48, and the arm 53 extends generally rearwardly and is apertured to receive the adjusting bolt 54 of a biasing spring 55. The lower end of the spring 55 is secured to an anchoring bracket 56 that is welded or otherwise fixed to or connected with the crank axle bar 15. When the parts are arranged as shown in Figure 2, which is the normal operating position in which the frame is lowered and the tools 4 operating in the soil, the roller 43 is disposed in one of the notches 41 or 42, the notch 42 as shown in Figure 2, in which position the driving and driven members of the clutch 18 are held in disengaging position by means, including a locking plate 58, carried by and movable relative to the driven clutch member.

Whenever the latch dog 44 is moved in a clockwise direction (Figures 2 and 3), the roller 43 is moved out of the notch 42 and this permits the clutch connecting means within the casing 40 to connect the driving and driven clutch members, whereupon the rotation of the ground wheel 11 serves to swing both cranks 21 and 22 generally rearwardly and upwardly (Figure 2), thus raising the frame relative to the ground wheel, the crank axle 10 swinging downwardly about its pivots 31. When the clutch parts are connected the casing 40 rotates with the axle shaft 16 and cranks 21, 22, and during this action, the auxiliary roller 51 (Figure 5) rolls along the flange 40a of the casing 40, in which flange the notches 41 and 42 are formed. The spring 55 acting through the arm 53 exerts a continual bias against the latch dog 44 tending to cause it to enter the next notch which reaches it during the rotation of the casing 40 when the clutch parts are connected.

Figure 3:
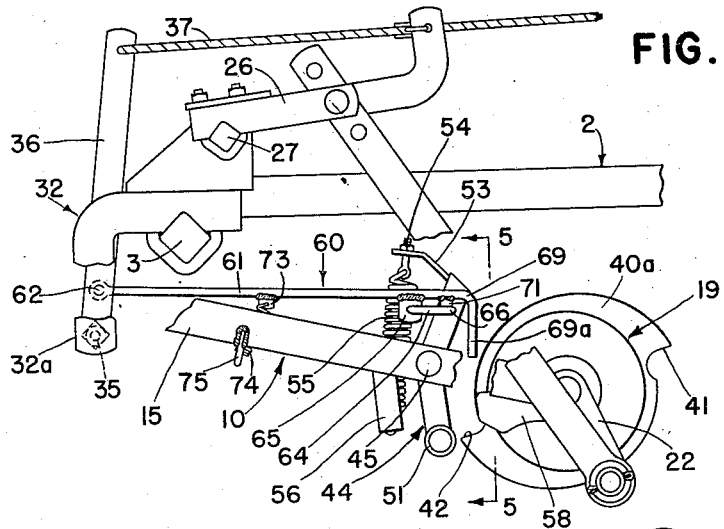
Figures 3 and 4 are enlarged fragmentary views illustrating the action of the automatic latch dog return and connection disabling mechanism.

According to the principles of the present invention, connecting means between the actuating lever 36, which is manually controlled, and the clutch dog 44 is provided which may be disconnected in response to a given or predetermined movement of the driven clutch part, such as the casing 40. To this end, I have provided a toggle mechanism, indicated in its entirety by the reference numeral 60 and which comprises a first toggle link 61 pivoted, as at 62, at its rear end to the actuating lever 36 at a point that is closely adjacent the axis 31, 31 of swinging movement of the crank axle 10. It is for this reason that the bracket extension 32a, on which the actuating lever 36 is pivoted at 35, is provided. A second toggle link 64, which is preferably in the form of a U-shaped member, is pivoted at one end to a bracket 65 welded to the link 61 adjacent its forward end, the other or forward end of the second toggle link 64 being extended, as at 66, through both of the straps 47 and 48 of the latch dog 44 (Figure 5). The longer toggle link 61 is extended, as at 69, and is provided with an abutment 71 that serves as a stop engageable with the end 66 of the second toggle link 64 to define the extended or locked position of the toggle links 61, 64. The link 61 is provided with a small bracket 73 to which a spring 74 is connected, the spring being anchored to a clip 75 welded to the bar 15 of the crank axle 10, as best shown in Figure 3. The spring 74 thus biases the toggle links for movement into a locked position, which is determined and maintained by the engagement of the stop 71 with the second toggle link 64. The extension 69 of the first toggle link 61 is carried laterally and downwardly, as at 69a, to position the end thereof directly in the path of movement of the flange 40a of the casing 40.

The operation of the preferred form of this invention as described above is substantially as follows.

Figure 4:
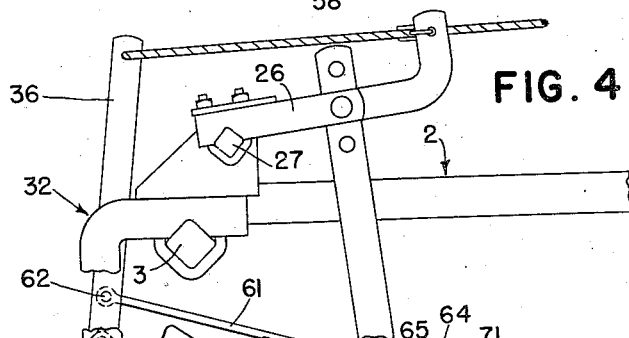

Figure 2 shows the parts when the tools are in ground engaging or operating position. Assuming that the operator desires to raise the tools 4 into an inoperative or transport position, he exerts a pull on the cable 37, 37a which swings the actuating levers 36 forwardly, mention being made above of the fact that the implement 1 includes lifting clutch and crank axle means at each side. As best shown in Figure 3, whenever the actuating lever 36 is swung forwardly, or clockwise as viewed in Figure 3, a thrust is transmitted through the extended or locked toggle links 61 and 64, swinging the latch dog 44 about its pivot support 45 in a clockwise direction, which moves the roller 43 (Figure 1) out of the notch 42 (Figure 2). This movement permits the clutch parts to engage and connect the driven clutch member to the driving clutch member, whereupon the forward travel of the machine causes the ground wheel 11 to rotate and swing the cranks 21, 22 in a clockwise direction, the casing 40 moving with the cranks. Referring now to Figure 3, and remembering that the toggle link extension end 69a is in the path of movement of the casing flange 40a, it will be seen that after the clutch has been rotated through approximately thirty degrees, one side of the notch 42 will come into contact with the end 69a of the toggle link 61, moving it upwardly into the position shown in Figure 4, thus breaking the toggle and disabling the connection between the actuating lever 36 and the latch dog 44. As soon as the pivot point between the toggle links 61 and 64 passes above a line connecting the pivot 62 and the pivot 66, the spring 55 then acts to return the latch dog 44 to a position in which the auxiliary roller 51 rides along the periphery of the flange 40a, this being the position shown in Figure 4. It will be observed that this action takes place even though the manual control actuating lever 36 is held in its forward position. Thus, even though the operator fails to release the cable 37, the latch dog 44 is in a position to disengage or disconnect the clutch upon the completion of the half-revolution cycle, at which time the roller 43 engages the notch 41, thus terminating the clutch action and disconnecting the clutch. The toggle is then reset by the operator releasing his hold on the cable 37, permitting the lever 36 to swing rearwardly until the spring 74 swings the toggle link 61 downwardly until the links 61 and 64 occupy the position show in Figure 2, which position is determined by the engagement of the stop or abutment 71 with the end 66 of the link 64. It will be seen, particularly from Figures 3 and 4, that the spring 74 also serves as means for swinging the actuating lever 36 rearwardly. If desired, of course, a spring may be connected directly with the lever 36 to return it to its rear position.

Figures 6, 7 and 8 illustrate a modified form of the present invention in which the cable-controlled clutch operating member is mounted on the crank axle, as is usually the case in such implements as towed plows and the like, rather than on the frame as in the implement described above. Referring now more particularly to Figures 6–8, the plow is indicated in its entirety by the reference numeral 80 and includes a generally longitudinally extending beam 81, the front end of which is provided with suitable draft means (not shown) for connecting the implement to a source of power, and the rear end of which is adapted to carry, in any suitable manner, one or more plow bottoms 82. Bolted to the beam 81 is a supporting bracket 83 carrying suitable bearing means in which the horizontal portion 84 of a crank axle 85 is disposed for swinging movement. Fixed to the front end of the crank axle 85 is the socket portion 86 of an axle housing 87, the lower portion of which includes a generally horizontally disposed sleeve section in which a crank shaft 88 is disposed. A lifting arm 89 is fixed, as by welding, to the inner end of the axle shaft 88 and is connected by a lifting link 91 to a depth adjusting lever 92 which is connected, as by a pivot bolt 93, to the beam 81. A sector 94 cooperates with detent mechanism 95 carried by the lever 92 for locking the latter in different positions. A ground wheel 99 is journaled for rotation on the axle 88 and is connected to drive a self-interrupting clutch unit 100 which, in turn, drives the axle shaft 88 and the lifting crank 89 when the clutch unit is connected. The clutch 100 is of conventional construction and need not be described in detail. Briefly, such clutch includes a drive member to which the wheel 99 is fixed and a driven member of which the plate 101 is a part, the plate having a pair of oppositely arranged notches 102 and 103. The engagement and disengagement of the driving and driven clutch parts is controlled by a clutch dog 105, and the position of the clutch dog on the driven clutch member 101 is controlled by a latch dog 106 and associated mechanism, with which the present invention is more particularly concerned.

The clutch latch dog 106 preferably comprises a pair of strap members 107 and 108 (Figure 7) suitably apertured so as to be mounted for pivotal movement on a pin 109 carried by the axle housing 87. The upper ends of the latch dog straps 107 and 108 are connected together by a cross piece 111 which extends laterally inwardly, as at 112, and is apertured at 112' to receive a threaded adjusting spring bolt 113. A spring 114 is connected at its upper end to the adjusting bolt 113 and at its lower end to a lug 115 (Figure 6) forming a part of the axle housing socket 86. The lower ends of the strap members 107 and 108 are connected together by a pin 118 upon which a pair of rollers 119 and 120 are mounted. The roller 119 is disposed in the plane of the plate or flange 101, while the other roller 120 is disposed in the plane of the clutch controlling dog 105.

An actuating lever, indicated in its entirety by the reference numeral 125, for operating the latch dog 106, is also mounted for rocking movement on the pin 109, as best shown in Figure 7. The actuating lever 125 includes a strap member 126 having a slot 127 formed adjacent the upper extended end 128 of the latch dog strap 108. The extended portion 128 is provided with an open-end slot 129, the slot 127 extending a short distance above the end of the section 128. A rod 131 is disposed in a generally vertical position and has an end 132 disposed in the slots 127 and 129 when the lever 125 is connected to the latch dog 106. The lower end of the rod 131 is provided with a laterally turned end 133 pivotally disposed in an aperture formed in one arm 135 of the bell crank 136 also mounted for rocking movement on the pin 109, preferably between the strap members 107 and 108 of the latch dog 106. A second arm 137 of the bell crank 136 is apertured to receive the lower end of a spring 138, the upper end of which is connected by an eye-bolt 139 or the like to the actuating lever 125. As best shown in Figure 8, the spring 138 acts to hold the latch rod 131 in a position connecting the lever 125 with the latch dog 106. An abutment extension 141 is formed on the bell crank 136 and, as best shown in Figure 7, is disposed in the path of movement of the notched portions 102 and 103 of the driven clutch plate member 101.

The operation of this form of the invention is substantially as follows:

When the operator pulls on the cable 150 (Figure 6), the forward movement of the actuating lever 125 acts through the latch rod 131 to swing the latch dog 106 in a clockwise direction (Figure 6), thus shifting the rollers 119 and 120 away from the clutch unit 100. As soon as the latch dog 106 is disengaged from the clutch dog 105, the latter moves into a position connecting the driving and driven members of the clutch, whereupon the forward travel of the plow and the resulting rotation of the wheel 99 starts the clockwise rotation of the clutch parts and the crank (see Figure 8), eventually swinging the lifting crank 89 through approximately ninety degrees, which permits the beam 81 and associated parts to lower. However, at the beginning of the lowering movement, the driven clutch member 101 is rotated in a clockwise direction (Figure 6) and as the longer portion of the notched section 103 of the member 101 comes into engagement with the abutment portion 141 of the bell crank 136, as shown in Figure 8, the bell crank member is swung in a counterclockwise direction, which forces the latch rod 131 into the upper end of the slot 127 and releasing the latch dog 106. As soon as the upper end 132 of the latch rod 131 is disengaged from the notch 129, the spring 114 immediately rocks the latch dog 106 in a counterclockwise direction and disposes the roller 120 in a position against the edge of the flange 101 and ready to reengage the notch 102, entirely irrespective of whether or not the operator releases the cable 150 by the time the clutch mechanism moves through a half revolution. Thus, the clutch movement is limited to a half revolution, entirely irrespective of whether or not the operator releases the cable or maintains his hold on the cable. However, as soon as the cable 150 is released, the actuating lever 125 is returned to its rear position by any suitable means, such as a spring 151, the upper end of the latch dog extension 128 being inclined so as to lift the latch rod 131 to the upper end of the slot 127 whereupon the spring 151 then reengages the latch rod 131 with the notch 129 in the extension 128 of the latch dog 106, thereby restoring the connection between the actuating lever 125 and the clutch controlling latch dog 106.

While I have shown and described above the preferred structure of the present invention, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, having a part to be moved from one position to another, self-interrupting clutch means for shifting said part and including a member movable into a position for causing said clutch to shift said part and a projection movable with the clutch during operation thereof, releasable control means connected with said member and including an abutment extending normally into the path of movement of said projection and movable generally in the same direction when said projection engages said abutment, and means responsive to movement of the abutment in said one direction for releasing said control means.

2. In an agricultural implement, a self-interrupting clutch, a movable control part for controlling said clutch and biased for movement into a position disconnecting said clutch, means including disconnectible parts for moving said part against said bias into a position connecting said clutch, one of said parts including pivoted arm means having an end extending toward said clutch, and means carried by said clutch engageable with said arm end for shifting the latter and disconnecting said disconnectible parts so as to permit said control part to be moved by said bias into a position disconnecting said clutch.

3. Tripping mechanism for a self-interrupting clutch for agricultural implements and the like, said clutch having a controlling part and including an optionally driven member, said tripping mechanism comprising a pair of toggle links, means separate from said toggle links urging said controlling part to an engaging position, means acting through said toggle links when in extended relation for actuating said controlling part, and means responsive to a predetermined movement of said driven member and acting against said bias from breaking said toggle links and permitting the movement of said controlling part to its engaging position independently of the position of said toggle link actuating means.

4. A self-interrupting clutch comprising clutch mechanism including driving and driven parts, a member for controlling said mechanism, means biasing said member for movement into a position to disconnect said driving and driven parts, means including a pair of toggle links, means acting to transmit force through said toggle links, when in extended position, for moving said member against said biasing means to connect said driving and driven parts, and means responsive to a predetermined movement of said driven member for disabling said toggle links, thereby permitting said controlling member to return to said position.

5. An agricultural implement comprising a swingable crank axle, a wheel thereon, a wheel driven self-interrupting clutch unit including driving and driven members and mechanism releasably connecting said members, a part pivoted on said crank axle normally biased for movement into a position disconnecting said driving and driven members, means including a pair of toggle links connected with said pivoted part, means acting to transmit force through said toggle links, when in extended position, for moving said pivoted part into a position providing for the connection of said driving and driven members, and means responsive to the movement of said driven member for breaking said toggle and permitting said pivoted part to move into a position disconnecting said driving and driven members.

6. In an agricultural implement, a support, a crank axle movably mounted on said support for swinging movement about an axis, a pivoted clutch controlling latch dog mounted on said swingable crank axle, an actuating lever pivoted to said support for movement about an axis, a pair of pivotally interconnected toggle links pivotally connected, respectively, with said actuating member and said latch dog, yielding means holding said toggle links in extended operative position, whereby movement of said actuating lever acts through said toggle links to shift said latch dog, and means for disabling the connection between said actuating member and said latch dog by moving said toggle links into an inoperative position.

7. The invention set forth in claim 6, further characterized by biasing means acting against said latch dog for swinging the same into one position, said actuating lever acting through said toggle links for shifting the pivoted latch dog into another position against the action of said biasing means, the latter serving to return said latch dog to said one position when said toggle links are moved into their inoperative position.

8. In an agricultural implement, self-interrupting clutch mechanism including a movable latch dog and driving and driven members, means for operating said latch dog for driving an actuating member, a pair of toggle links connected between said actuating member and said latch dog and normally held in extended operating position, whereby movement of said actuating member acts through said toggle links in their extended operating position for shifting said latch dog, and means responsive to the movement of one of said members for moving said toggle links into an inoperative position.

9. In an agricultural machine, a self-interrupting clutch including driving and driven parts, a pivoted latch dog therefor biased for movement into a clutch disconnecting position, means for moving said latch dog out of said position including a pair of toggle links, one of said links including a section extending over into the path of movement of a part on one of said driving and driven parts, and an actuating member acting through said toggle links for moving said latch dog, movement of said one member acting through said extension for breaking the toggle and permitting said latch dog to move into its clutch disconnecting position independently of the position of said actuating member.

10. An agricultural implement comprising a swingable crank axle, a wheel thereon, a wheel driven self-interrupting clutch unit including driving and driven members and mechanism releasably connecting said members, a part pivoted on said crank axle normally biased for movement into a position disconnecting said driving and driven members, a lever for operating said part mounted for movement about the axis of movement of said part, a shiftable latch carried by said lever and adapted to releasably engage said part, spring means acting against said latch for moving the latter into engaging relation with said part, and a second lever also mounted for movement about the axis of pivotal movement of said part and connected with said latch, said second lever including a portion disposed in the path of movement of said driven clutch member whereby movement of the latter through a given extent shifts said latch into a position disconnecting said first mentioned lever from said pivoted part.

11. In an agricultural implement, a support, a crank axle movably connected with said support and carrying at its swinging end a controllable clutch, a latch dog movably mounted on said swingable crank axle for controlling said clutch, an actuating lever pivotally mounted on said support for movement about an axis closely adjacent the axis of said swingable crank axle, and means connecting said actuating lever with said pivoted latch dog, said last mentioned means comprising a toggle linkage connected at one end with the actuating lever and at the other end with said pivoted latch dog.

12. In an agricultural implement having a movable part, means for moving said part, releasable means including a control member and adapted to normally hold said movable part against movement, the combination therewith of means for operating said control member comprising an operating member, disconnectible means connected between said operating member and said control member and including a first toggle link connected at one end to one of said members, a second toggle link pivotally connected to the other end of said first toggle link and including a section extending beyond said first toggle link, stop means carried on said toggle link extension and engageable with said first toggle link to limit the position of one link relative to the other, and means movable with said movable part in such a path of movement as to be engageable with said toggle link extension for moving said links into a disconnected position after the occurrence of a given movement of said movable part.

13. In an agricultural implement, a support, a crank axle movably connected with said support and carrying at its swinging end a controllable clutch, a latch dog movably mounted on said swingable crank axle for controlling said clutch, an actuating lever movably mounted on said support adjacent said swingable crank axle, and means connecting said actuating lever with said pivoted latch dog, said last mentioned means comprising a toggle linkage connected at one end with the actuating lever and at the other end with said pivoted latch dog.

WALTER H. SILVER.

REFERENCES CITED

The following references are of record in the file of this patent:

UNITED STATES PATENTS

| Number | Name | Date |
| --- | --- | --- |
| 519,173 | Campbell | May 1, 1894 |
| 2,178,205 | Johnson | Oct. 31, 1939 |
| 2,204,421 | Loshbough | June 11, 1940 |
| 2,259,297 | Cramer | Oct. 14, 1941 |
| 1,710,705 | Loshbough | Apr. 30, 1929 |
| 1,853,766 | Hahnemann | Apr. 12, 1932 |
| 2,256,039 | Axtell | Sept. 16, 1941 |
| 1,669,037 | Boda | May 8, 1928 |
| 1,140,428 | Winter | May 25, 1915 |
| 1,682,373 | Davis | Aug. 28, 1928 |

FOREIGN PATENTS

| Number | Country | Date |
| --- | --- | --- |
| 778,652 | French | Jan. 2, 1935 |